3,177,209
DIHYDROANTHRACENE COMPOUNDS
Torkil O. Holm, Copenhagen, Denmark, assignor to
Kefalas A/S, Copenhagen-Valby, Denmark
No Drawing. Filed Sept. 7, 1961, Ser. No. 136,427
Claims priority, application Great Britain, Sept. 16, 1960,
32,011/60; Feb. 17, 1961, 5,893/61
22 Claims. (Cl. 260—240)

The present invention relates to novel dihydroanthracene compounds of the general formula:

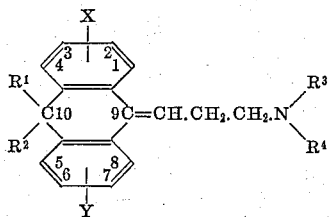

(I)

wherein $R^1$ and $R^2$ each represents a lower-alkyl group, $R^3$ and $R^4$ each represents a lower-alkyl group, or one may represent a lower-alkyl group and the other a benzyl group, or $R^3$ and $R^4$ taken together with the nitrogen atom represent the radical of a heterocyclic amine having a saturated five-membered or six-membered ring, X represents hydrogen, halogen, a lower-alkyl group, or a lower-alkyloxy group, and Y repreesnts hydrogen or halogen, as well as acid addition salts thereof.

It is an object of the preesnt invention to provide novel dihydroanthracene compounds, a method of making the same, a method for the alleviation, palliation, mitigation, or inhibition of the manifestations of certain physiological-psychological abnormalities of human beings therewith, and pharmaceutical compositions comprising such novel dihydroanthracene compounds as active ingredient. Other objects will be apparent to one skilled in the art and still other objects will become apparent hereinafter.

The compounds of Formula I and the acid addition salts thereof are useful therapeutics and possess valuable pharmacodynamic properties. In animal experiments the compounds show sedative effects. They further exhibit a mydriatic and anticholinergic effect and potentiate the effect of adrenaline, noradrenaline and barbiturates. In addition, some of the compounds of Formula I show local anesthetic effects. In clinical trials the compounds of Formula I, and especially 9-gamma-dimethylaminopropylidene-10,10-dimethyl - 9,10 - dihydroanthracene, have been found effective in the treatment of psychotic patients, for example patients suffering from depressions.

When the compounds of Formula I are asymmetrically substituted in the phenyl rings, they may exist as two geometric isomers of the cis-trans type, which isomers although similar are not identical with respect to their pharmacodynamic properties. The isomers may be separated according to procedure conventional in the art.

The compounds of Formula I and the acid addition salts thereof may be administered both orally and parenterally, for example in the form of tablets, capsules, powders, syrups or solutions for injection.

The invention moreover relates to a method for the preparation of compounds of Formula I, whereby a 10,10-diloweralkyl-anthrone compound of the following formula:

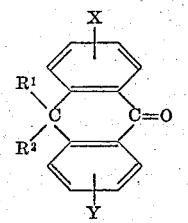

(II)

wherein $R^1$, $R^2$, X and Y are as defined above, is subjected to a Grignard reaction with a Grignard reagent of the formula:

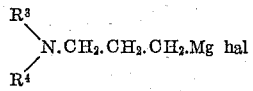

wherein $R^3$ and $R^4$ are as defined above and "hal" represents a halogen atom, and the magnesium complex obtained hydrolyzed in the usual manner, as with water, ice-water, ice or the like, whereupon the resulting anthrol compound of the formula:

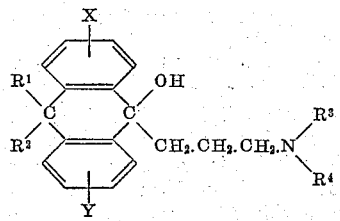

(III)

wherein all of the symbols have the values previously assigned, is dehydrated, and the resulting compound of Formula I isolated as the free base or in the form of an acid addition salt and, in the event said compound of Formula I or said addition salt thereof is a mixture of isomers, individual isomers thereof isolated, if desired, by procedure already known for the separation and isolation of such isomers.

The Grignard reaction step according to the invention may conveniently be carried out according to conventional procedure for such reactions in an inert solvent such as diethyl-ether, di-n-butyl-ether, tetrahydrofuran, or the like.

The dehydration step according to the invention may be effected by means of agents ordinarily used for such purpose, e.g., inorganic acid halides such as phosphorus oxychloride and thionyl chloride, hydrogen halides, sulphuric acid, iodine in benzene, potassium bisulphate, zinc chloride, and the like, and it has been found very convenient to carry out said dehydration by reacting compounds of Formula III, which are hitherto unknown, with a hydrogen halide, e. g., hydrogen chloride, in an inert organic solvent such as chloroform, benzene, toluene or the like.

The acid addition salts of the novel compounds of Formula I are preferably salts of pharmacologically acceptable acids such as mineral acids, for example, hydrochloric acid, hydrobromic acid, phosphoric acid, sulphuric acid, and the like, and organic acids such as acetic acid, tartaric acid, maleic acid, citric acid, ethanesulphonic acid and the like.

In the foregoing Formula I and elsewhere herein, the terms lower-alkyl and lower alkyloxy refer to alkyl or alkyloxy radicals containing up to and including eight carbon atoms, and preferably no more than three carbon atoms, which radicals may have either straight or branched-chain structure, for example methyl, ethyl, propyl, isopropyl, butyl, isobutyl, amyl, hexyl, heptyl, octyl, methoxy, ethoxy, propoxy, butoxy, amyloxy, hexoxy, heptoxy, or the like.

As representative examples of radicals in which $R^3$ and $R^4$ together with the nitrogen atom in Formula I represent the radical of a heterocyclic amine having a saturated five-membered or six-membered ring may be mentioned the pyrrolidine, piperidine, morpholine, thiamorpholine, $N^1$-lower-alkylpiperazine, e.g., N'-methylpiperazine, or such radicals containing from one to four or even more C-lower-alkyl, e.g., C-methyl, substituents, e.g., tetramethylpyrrolidine, and like radicals.

The starting 10,10-dilower-alkyl-anthrone compounds of Formula II are preferably such compounds wherein X and Y are hydrogen and, in the Grignard reagent, $R^3$ and $R^4$ are preferably methyl groups, not only from the standpoint of pharmacological importance and availability of these starting materials, but also from the standpoint of ease of operation and smoothness of reaction.

The following examples are given by way of illustration only and are not be construed as limiting.

*Example 1.—9-gamma-dimethylaminopropylidene-10,10-dimethyl-9,10-dihydroanthracene and its hydrochloride*

To 36 grams (0.171 mole) of 10,10-dimethylanthrone dissolved in 300 milliliters of ether is added a dispersion of 0.3 mole of dimethylaminopropylmagnesium chloride in 400 milliliters of ether. The reaction mixture is stirred for one hour under gentle reflux. Thereafter 100 milliliters of water are added dropwise, and the ether phase is separated and evaporated to dryness. The residue, consisting mainly of 10,10-dimethyl-9-gamma-dimethylaminopropyl-9-anthrol is dissolved in 100 milliliters of chloroform and a stream of dry hydrogen chloride introduced into the solution. This introduction is continued, while refluxing for half an hour on a steam bath, whereupon the solution is evaporated to dryness in vacuo. The residue is recrystallized from acetone, and the crystals of the hydrochloride of 9-gamma-dimethylaminopropylidene-10,10-dimethyl-9,10-dihydroanthracene formed are separated from solvent by vacuum filtration and dried. M.P. 245–248 degrees centrigrade.

*Example 2.—9-gamma-dimethylaminopropylidene-10,10-diethyl-9,10-dihydroanthracene and its hydrochloride*

When Example 1 is carried out using 42.5 grams (0.171 mole) of 10,10-diethylanthrone instead of 10,10-dimethylanthrone, the hydrochloride of 9-gamma-dimethylaminopropylidene-10,10-diethyl-9,10-dihydroanthracene is obtained. M.P. 176–179 degrees centigrade.

*Example 3.—9 - gamma - dimethylaminopropylidene - 2-chloro-10,10-dimethyl-9,10-dihydroanthracene, its geometric isomers, and hydrochlorides thereof*

When Example 1 is carried out using 44 grams (0.171 mole) of 2-chloro-10,10-dimethylanthrone (M.P. 95–100° C.) instead of 10,10-dimethylanthrone, the hydrochloride of one of the geometric isomers of 9-gamma-dimethylaminopropylidene-2-chloro-10,10-dimethyl-9,10 - dihydroanthracene is isolated in a yield of twenty grams as a white crystalline powder melting at 255–257 degrees centigrade.

The acetone mother liquor from the crystallization of this isomer is evaporated to dryness, the residue recrystallized from methanol, and the crystals of the other geometric isomer are separated by vacuum filtration and dried. M.P. 216–218 degrees centigrade. Yield ten grams.

*Example 4.—9 - gamma - dimethylaminopropylidene - 3-chloro-10,10-dimethyl-9,10-dihydroanthracene and its hydrochloride*

When Example 1 is carried out using 44 grams (0.171 mole) of 3-chloro-10,10-dimethylanthrone instead of 10,10-dimethylanthrone, the hydrochloride of 9-gamma-dimethylaminopropylidene - 3-chloro-10,10-dimethyl-9,10-dihydroanthracene is obtained. M.P. 213–216 degrees centigrade.

*Example 5.—9 - gamma-N-piperidinopropylidene-10,10-dimethyl-9,10-dihydroanthracene and its hydrochloride*

When Example 1 is carried out using 0.2 mole of N-gamma-piperidinopropylmagnesium chloride instead of dimethylaminopropylmagnesium chloride, the hydrochloride of 9-gamma-N-piperidinopropylidene-10,10-dimethyl-9,10-dihydroanthracene is obtained. M.P. 266–269 degrees centigrade. Yield 35 grams.

*Example 6.—Other 9-gamma-dimethylaminopropylidene-2- and -3-halo-10,10-dimethyl-9,10-dihydroanthracenes and salts thereof*

In the same manner as given in Example 1, the compounds 2- and 3-bromo-9-gamma-dimethylaminopropylidene-10,10-dimethyl-9,10-dihydroanthracene and 2- and 3 - fluoro-9-gamma-dimethylaminopropylidene-10,10-dimethyl-9,10-dihydroanthracene are prepared, by respectively employing as starting materials for reaction with the dimethylaminopropylmagnesium chloride, 2- or 3-bromo-10,10-dimethylanthrone and 2- or 3-fluoro-10,10-dimethylanthrone. The 2- or 3-iodo compounds are similarly prepared from the 2- or 3-iodo-10,10-dimethyl anthrones. Their acid addition salts are produced and isolated in the manner of Example 1, using for example hydrochloric, hydrobromic, sulphuric, acetic, nitric, phosphoric, lactic, citric, tartaric, malonic, oxalic, methane or ethane-sulphonic, or like acids. In exactly the same manner, the corresponding 2,7-dichloro compounds are prepared starting from the 2,7-dichloro-10,10-dimethyl-anthrone and dimethylaminopropylmagnesium chloride.

*Example 7.—Other 9,10-dihydroanthracenes and salts thereof*

In the same manner as given in Example 1, the compounds 9-(gamma - N - pyrrolidinopropylidene)-10,10-dimethyl-9,10-dihydroanthracene and 9-[gamma-(N'-methyl-N-piperazino)-propylidene] - 10,10-dimethyl-9,10-dihydroanthracene are prepared, by respectively employing as starting materials for reaction with the 10,10-dimethyl-anthrone, the compounds N-gamma-pyrrolidinopropylmagnesium chloride and gamma-(N'-methyl - N - piperazino)-propylmagnesium chloride. Their acid addition salts are produced and isolated in the manner of Example 1, using for example hydrochloric, hydrobromic, sulphuric, acetic, nitric, phosphoric, lactic, citric, tartaric, malonic, oxalic, methane or ethane-sulphonic, or like acids.

*Example 8.—Other acid addition salts*

In the same manner as given in Example 1, other acid addition salts of the compounds of the foregoing examples are prepared by employing other acids in place of the dry hydrogen chloride used in Example 1. For example, by employing hydrobromic, tartaric, malonic, oxalic, methane or ethanesulphonic, or like acids, the corresponding acid addition salts of the free basic amines of these examples are produced.

The compounds of Formula I and the acid addition salts thereof may be administered to animals including human beings both orally and parenterally, and may be used for example in the form of tablets, capsules, powders, syrups or in the form of the usual sterile solutions for injection. Results upon administration to human beings have been very gratifying.

Most conveniently the compounds of Formula I are administered orally in unit dosage form such as tablets or capsules, each dosage unit containing a non-toxic acid addition salt of one of the said compounds in an amount of from 5 to 100 mg. calculated as the free amine, the total daily dosage usually ranging from about 15 mg. to 1500 mg. The exact individual dosages as well as daily dosages in a particular case will of course be determined according to established medical principles under the direction of a physician.

When preparing tablets, the active ingredient is for the most part mixed with ordinary tablet adjuvants such as corn starch, potato starch, talcum, magnesium stearate, gelatine, lactose, gums, or the like. A suitable formula for a tablet containing 25 mg. 9-gamma-dimethylaminopropylidene - 10,10 - dimethyl - 9,10 - dihydroanthracene (called N 7001 for short) in the form of its hydrochloride is as follows:

|  | Mg. |
|---|---|
| N 7001, hydrochloride | 28 |
| Potato starch | 36 |
| Lactose | 18 |
| Gelatine | 5 |
| Talcum | 6 |
| Magnesium stearate | 0.4 |

Any other pharmaceutical tableting adjuvants may be used provided that they are compatible with the active ingredient, and additional compositions, dosage forms, individual dosages and daily dosages may be the same as or approximate those presently in use for the drug "imipramine."

As previously stated, when isolating the compounds of Formula I in the form of an acid addition salt, the acid is preferably selected so as to contain an anion which is non-toxic and pharmacologically accepable, at least in usual therapeutic dosages. Representative salts which are included in this preferred group are the hydrochlorides, hydrobromides, sulphates, acetates, phosphates, nitrates, methanesulphonates, ethanesulphonates, lactates, citrates, tartrates or bitartrates, and maleates of the amines of Formula I. Other acids are likewise suitable and may be employed if desired. For example, fumaric, benzoic, ascorbic, succinic, salicylic, bismethylene-salicylic, propionic, gluconic, malic, malonic, mandelic, cinnamic, citraconic, stearic, palmitic, itaconic, glycolic, benzenesulphonic and sulphamic acids may also be employed as acid addition salt-forming acids. When it is desired to isolate a compound of the invention in the form of the free base, this may be done according to conventional procedure, as by dissolving the isolated or unisolated salt in water, treating with a suitable alkaline material, extracting the liberated free base with a suitable organic solvent, drying the extract and evaporating to dryness or fractionally distilling to effect isolation of the free basic amine.

It is to be understood that the invention is not limited to the exact details of operation or exact compounds or compositions shown and described, as obvious modifications and equivalents will be apparent to one skilled in the art, and the invention is therefore to be limited only by the scope of the appended claims.

I claim:
1. A compound selected from the class consisting of (1) aminopropylidene 9,10-dihydroanthracenes of the formula:

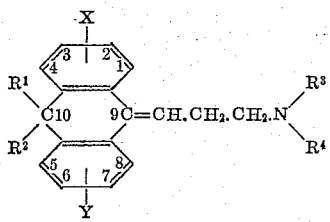

in which each of $R^1$ and $R^2$ is a lower-alkyl group, X is selected from the group consisting of hydrogen, halogen, lower-alkyl and lower-alkyloxy, Y is selected from the group consisting of hydrogen and halogen, and

is selected from the group consisting of di-lower-alkylamino, benzyl-lower-alkylamino, and heterocyclic amine radicals, said heterocyclic amines being selected from the group consisting of pyrrolidine, piperidine, morpholine, thiamorpholine, $N^1$-lower-alkylpiperazine, and C-loweralkyl derivatives of the foregoing, and (2) acid addition salts thereof.

2. 9 -gamma - dilower - alkylaminopropylidene - 10,10-dilower-alkyl-9,10-dihydroanthracene.

3. 9 - gamma - dilower - alkylaminopropylidene - 10,10-dilower-alkyl-9,10-dihydroanthracene acid addition salts.

4. 9 - gamma-dilower-alkylaminopropylidene-10,10-dilower-alkyl-9,10-dihydroanthracene hydrochloride.

5. 9 - gamma-dimethylaminopropylidene-10,10-dimethyl-9,10-dihydroanthracene.

6. 9 - gamma-dimethylaminopropylidene-10,10-dimethyl-9,10-dihydroanthracene acid addition salts.

7. 9 - gamma-dimethylaminopropylidene-10,10-dimethyl-9,10-dihydroanthracene hydrochloride.

8. 9-gamma-dilower-alkylaminopropylidene - 2 - halo-10,10-dimethyl-9,10-dihydroanthracene acid addition salts.

9. 9-gamma-dilower-alkylaminopropylidene - 3 - halo-10,10-dimethyl-9,10-dihydroanthracene non-toxic acid addition salts.

10. 9 - gamma-N-piperidinopropylidene-10,10-dimethyl-9,10-dihydroanthracene acid addition salts.

11. 9-gamma - dilower - alkylaminopropylidene-2-chloro-10,10-dimethyl-9,10-dihydroanthracene non-toxic acid addition salts.

12. 9 - gamma-dilower-alkylaminopropylidene-3-chloro-10,10-dimethyl-9,10-dihydroanthracene non-toxic acid addition salts.

13. 9 - gamma-dimethylaminopropylidene - 2 - chloro-10,10-dimethyl-9,10-dihydroanthracene non-toxic acid addition salts.

14. 9 - gamma-dimethylaminopropylidene - 3 - chloro-10,10-dimethyl-9,10-dihydroanthracene non-toxic acid addition salts.

15. An anthrol compound of the formula:

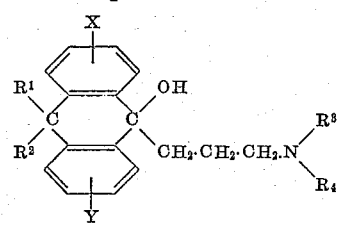

in which each of $R^1$ and $R^2$ is a lower-alkyl group, X is selected from the group consisting of hydrogen, halogen, lower-alkyl and lower-alkyloxy, Y is selected from the group consisting of hydrogen and halogen, and

is selected from the group consisting of di-lower-alkylamino, benzyl-lower-alkylamino, the radical of a heterocyclic amine, having a saturated five-membered ring, and the radical of a heterocyclic amine having a saturated six-membered ring, said heterocyclic amines being selected from the group consisting of pyrrolidine, piperidine, morpholine, thiamorpholine, $N^1$-loweralkylpiperazine, and C-lower-alkyl derivatives of the foregoing.

16. 9 - gamma - dilower - alkylaminopropyl-10,10-dilower-alkyl-anthrol-9.

17. 9-gamma-dimethylaminopropyl - 10,10 - dimethylanthrol-9.

18. 9 - gamma-dilower-alkylaminopropyl-2-halo-10,10-dimethyl-anthrol-9.

19. 9 - gamma-dilower-alkylaminopropyl - 2 - chloro-10,10-dimethyl-anthrol-9.

20. 9 - gamma-dilower-alkylaminopropyl-3-halo-10,10-dimethyl-anthrol-9.

21. 9 - gamma-dilower-alkylaminopropyl - 3 - chloro-10,10-dimethyl-anthrol-9.

22. 9 - gamma-N-piperidinopropyl-10,10-dimethyl-9,10-anthrol-9.

References Cited by the Examiner

UNITED STATES PATENTS

| | | | |
|---|---|---|---|
| 2,404,219 | 7/46 | Cusic | 260—293 |
| 2,891,957 | 6/59 | Allen et al. | 260—240 X |
| 2,907,761 | 10/59 | Benton | 260—240 |
| 2,951,082 | 8/60 | Sprague et al. | 260—240 X |
| 2,955,073 | 10/60 | De Beer | 167—65 |
| 2,996,545 | 8/61 | Bottoms | 260—570.8 |
| 3,035,977 | 5/62 | Abood | 167—65 |
| 3,073,847 | 1/63 | Doebel et al. | 260—240 X |

FOREIGN PATENTS

| | | |
|---|---|---|
| 99,624 | 5/60 | Czechoslovakia. |
| 1,109,166 | 6/61 | Germany. |

OTHER REFERENCES

Barnett et al.: Ber. d. Deut. Chem. Ges., vol. 62, pages 3067–3068 and 3072–4 (1929).

Bonvicino et al.: J. Org. Chem., vol. 26, pages 2383 to 2392 (July 1961).

Curtin et al.: J. of the Am. Chem. Soc., vol. 81, pages 4719–4728 (September 5, 1959).

Mychajlyszyn et al.: Collection of Czech. Chem. Communications, vol. 24, page 3955 (1959).

IRVING MARCUS, *Primary Examiner.*

JOHN D. RANDOLPH, *Examiner.*